US007737942B2

(12) United States Patent
Bajramovic

(10) Patent No.: US 7,737,942 B2
(45) Date of Patent: Jun. 15, 2010

(54) COMPUTER MOUSE ON A GLOVE

(76) Inventor: Mark B. Bajramovic, 24 Clemow Avenue, Ottawa, Ontario (CA) K1S 2B2

( * ) Notice: Subject to any disclaimer, the term of this patent is extended or adjusted under 35 U.S.C. 154(b) by 740 days.

(21) Appl. No.: 11/251,022

(22) Filed: Oct. 14, 2005

(65) Prior Publication Data
US 2006/0033710 A1 Feb. 16, 2006

Related U.S. Application Data

(63) Continuation-in-part of application No. 10/382,849, filed on Mar. 7, 2003, now Pat. No. 7,057,604, which is a continuation of application No. 09/899,277, filed on Jul. 6, 2001, now abandoned.

(51) Int. Cl.
*G09G 5/00* (2006.01)
(52) U.S. Cl. .................. 345/156; 345/157; 345/158
(58) Field of Classification Search .......... 345/156–158
See application file for complete search history.

(56) References Cited

U.S. PATENT DOCUMENTS

| 1,480,243 | A |   | 1/1924  | Clokey .................. 368/52 |
| 4,881,276 | A |   | 11/1989 | Swan ................... 2/161.1 |
| 4,954,817 | A |   | 9/1990  | Levine .................. 345/179 |
| 5,376,066 | A | * | 12/1994 | Phillips et al. ........... 602/21 |
| 5,444,462 | A |   | 8/1995  | Wambach ............... 345/158 |
| 5,517,211 | A |   | 5/1996  | Kwang-Chien .......... 345/166 |
| 5,581,484 | A |   | 12/1996 | Prince .................. 702/150 |
| 5,706,026 | A |   | 1/1998  | Kent et al. ............. 345/156 |
| 5,790,980 | A |   | 8/1998  | Yewer, Jr. ................ 2/20 |
| 5,914,704 | A |   | 6/1999  | Yamada et al. .......... 345/157 |
| 6,097,369 | A |   | 8/2000  | Wambach ............... 345/158 |

(Continued)

FOREIGN PATENT DOCUMENTS

EP 0646888 5/1995

(Continued)

OTHER PUBLICATIONS

*Atlas of Human Anatomy, Second Edition* 1997 by Frank H. Netter.

*Primary Examiner*—Henry N Tran
*Assistant Examiner*—Christopher E Leiby
(74) *Attorney, Agent, or Firm*—Jeffrey S. Sokol

(57) ABSTRACT

A computer input device on a glove includes fittings for a user's fingers and adjustable straps for fastening to a user's wrist. A tracking device for controlling cursor movement on a video display is affixed to the glove for positioning next to the end of one of the user's fingers. Pressure plates for controlling the various right and left mouse "clicking" functions are affixed to the glove for positioning next to the ends of the other of the user's fingers. Scrolling/paging buttons are located on the side of the fitting fitted to the index finger for pressing by the thumb. A transmitter is affixed to the glove for receiving signals from the tracking device, the pressure plates and the scrolling/paging buttons, and transmitting those signals to a computer for controlling cursor movement in the x-y plane on a video display and for controlling the various mouse "clicking" controls, which implement the "select" function, the "drag" function, the "scroll" function, the "page" function, and so forth.

18 Claims, 13 Drawing Sheets

U.S. PATENT DOCUMENTS

| | | | |
|---|---|---|---|
| 6,154,199 A | 11/2000 | Butler | 345/167 |
| 6,213,969 B1* | 4/2001 | MacMorran et al. | 602/64 |
| 6,216,276 B1* | 4/2001 | Eibert | 2/161.2 |
| 7,109,970 B1* | 9/2006 | Miller | 345/156 |
| 2001/0040550 A1* | 11/2001 | Vance et al. | 345/156 |
| 2002/0067342 A1 | 6/2002 | Proper | 345/163 |
| 2002/0175894 A1 | 11/2002 | Grillo | 345/156 |

FOREIGN PATENT DOCUMENTS

| | | |
|---|---|---|
| EP | 0696014 | 7/1996 |
| GB | 1480243 | 7/1977 |
| WO | WO 92/09983 | 6/1992 |
| WO | WO 02/27456 | 4/2002 |

* cited by examiner

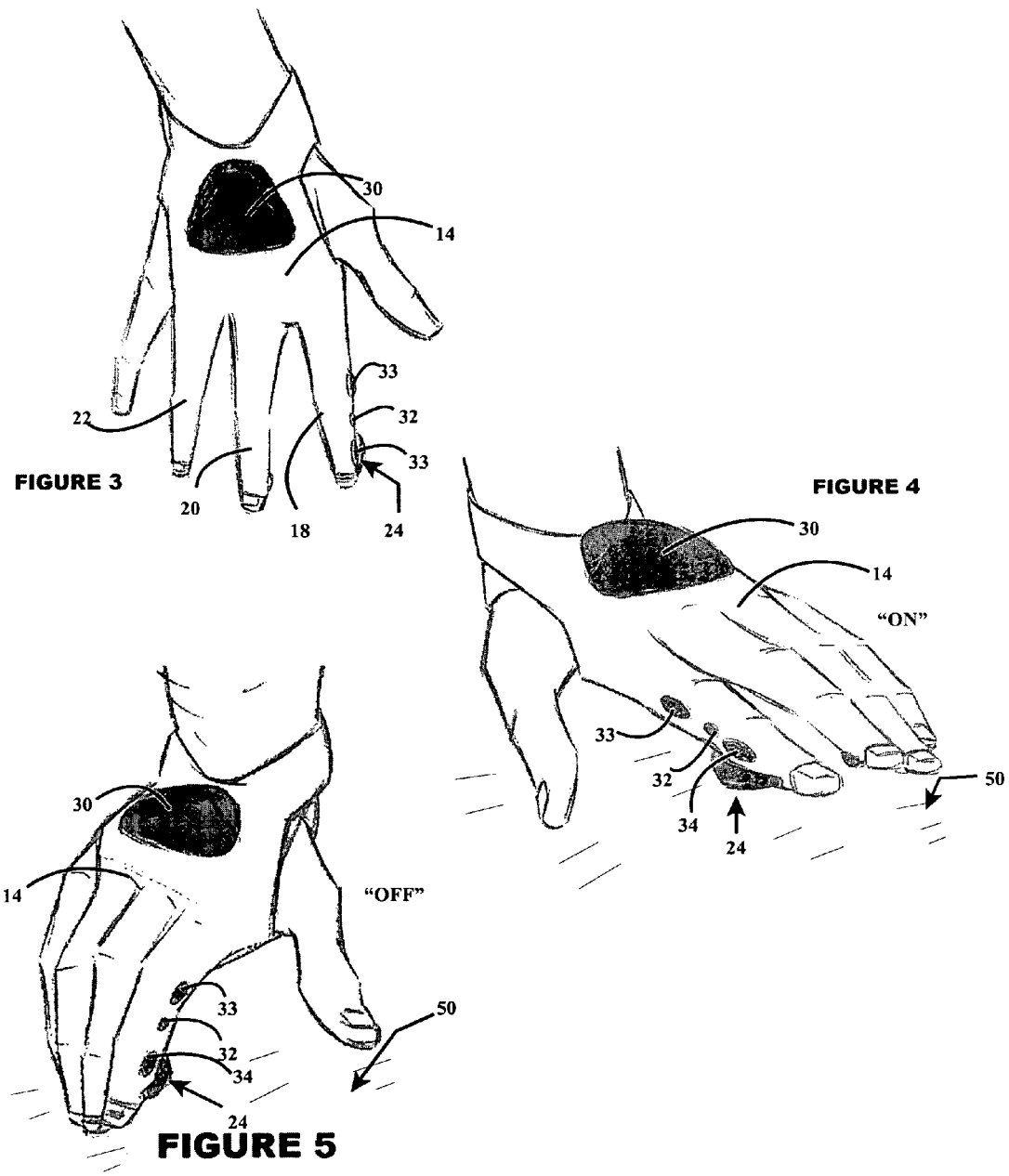

COMPUTER MOUSE ON A GLOVE

CROSS REFERENCE TO RELATED APPLICATION

This application is a continuation-in-part of application Ser. No. 10/382,849, filed Mar. 7, 2003, now U.S. Pat. No. 7,057,604, which is a continuation of application Ser. No. 09/899,277, filed Jul. 6, 2001, now abandoned.

BACKGROUND

1. Field

This invention relates generally to the field of peripheral computer input devices, and more particularly to a computer mouse of the type which controls cursor movement on a video display and the various "click" controls, which implement the "select" function, the "drag" function, the "scroll" function, the "page" function, and so forth.

2. Description of the Related Art

A mouse is used as a computer input device to control the location of a cursor on a video display connected to the computer. Typically, cursor location is controlled by movement of the mouse across a surface. The mouse includes a tracking device for measuring the movement of the mouse across the surface. This movement is relayed to the computer where it is translated into a corresponding movement of the cursor on the display. Several different tracking devices are known and used.

In addition, there are typically two or three buttons on the mouse for controlling switching functions. These switching functions are typically used to activate a function or command identified by the cursor location, or they can be set to control certain software features, such as highlighting in a word processor. Other mouse buttons may also be included and used to provide control for other software features such as scrolling or paging.

Many attempts have been made to design an easy to use computer mouse, which is ergonomically synchronized with the human form. Those attempts have generally been unsuccessful because the human hand comes in many shapes and sizes. Therefore, one size of computer mouse certainly does not fit all hand sizes. The result has been increasing incidents of carpal tunnel syndrome amongst mouse users as they struggle to conform their hands to the currently available designs.

The first computer mouse (the Engelbart mouse) was designed by a group of 17 researchers headed by Douglas C. Engelbart at the Stanford Research Institute in 1968. The Engelbart mouse was a handheld mobile device that used a combination of hardware and software to translate physical movements of a tracking device across a flat horizontal surface into digital signals to control movement of a cursor on a video display. Engelbart's design caused the user to orient his hand in a palm down posture on top of the mouse, with the hand and wrist arched upwardly. This hand posture proved to be the most popular amongst test groups and was the first to set the industry standard for the commercial computer mouse. The Engelbart design is used as the platform for all top selling computer mice and is the basis for many of the so-called "ergonomic" mouse product lines. Despite its commercial success, however, the Engelbart design places the user's hand and wrist in a "strained posture" (see FIG. 20). This posture causes excessive pressure on the hand, arm, and carpal tunnel of the wrist, and with repeated or prolonged use can result in repetitive stress injuries ("RSI").

Repetitive stress injuries are a group of injuries occurring from a series of small repeated traumas. By themselves, none of these injuries causes permanent damage. However, when these movements are repeated hundreds or thousands of times, such as with standard mouse or keyboard movements, they often place unnecessary stress on the tendons and nerves of the hand, wrist, arm, shoulder, and neck resulting in debilitating pain, and loss of sensation. Carpal Tunnel Syndrome ("CTS") is the most common RSI afflicting computer users today. CTS results from the pinching of the median nerve within the carpal tunnel of the hand, causing discomfort and numbness. The carpal tunnel is an opening into the hand that is made up of the bones of the wrist on the bottom and the transverse carpal ligament on top. Through this opening, the median nerve and the flexor tendons pass through into the hand. When abnormal pressure is placed on this area of the wrist, such as is caused by a conventional ergonomic mouse, this area can swell, pinching the nerve.

The problem with the standard Engelbart mouse design is that it requires a user to orient his hand in an unnatural upwardly arched posture known as the strained hand posture (see FIG. 20). In the strained hand posture, the weight of the user is not dispersed, but is concentrated on a small area located around the carpal tunnel of the wrist. As noted above, this can result in a pinching of the median nerve within the carpal tunnel causing discomfort and numbness. Moreover, if the user tenses his muscles at 20% of maximum, blood flow to the area is reduced by 80%. Most of today's commercially successful "ergonomic mice" are based on this design and thereby cause unnatural strain during use. It is this strain coupled with prolonged use that often results in the development of debilitating RSIs.

It would therefore be advantageous to design a computer mouse that required the user to keep her hand and wrist in a neutral hand posture during use, which is the posture that places the least amount of stress on the muscles and tissues of the hand, wrist, arm, and neck. In this neutral hand posture, the user's hand and wrist remain in a flatter, unarched posture, and the individual's weight is evenly dispersed between the hand, wrist, and arm. This posture minimizes the pinching of the median nerve within the carpal tunnel and allows for the greatest amount of blood flow to and from the hand by limiting the amount of flexion, extension and ulnar and radial deviation of the hand and wrist.

In addition to hand and arm strain, one major disadvantage of the conventional mouse design is that users often must spend valuable time searching their desktops to locate the mouse before using it. This disrupts the creative process and hinders both user performance and productivity.

Some attempts have been made to solve these problems by locating a tracking device, such as a track ball or a sensor pad, right on the computer keyboard, but some find these devices awkward to use and difficult to master. Moreover, such devices still require the user to remove his or her eyes from the display to find the exact location of the tracking device. This process can interrupt work flow and reduce productivity.

One solution to these problems is to integrate the functions of a computer mouse with the individual user's hand. A recent attempt to do this is described in U.S. Pat. Nos. 5,444,462, and 6,097,369 issued to Wambach on Aug. 22, 1995 and Aug. 1, 2000, respectively. Wambach describes a glove to be worn on a user's hand wherein the glove includes micro-switches mounted next to a joint of the index finger and on opposite sides of the wrist. The switches translate up and down movement of the index finger and side to side movement of the wrist into vertical and horizontal movements, respectively, of a cursor on a computer display. Buttons are provided on the other fingers to provide mouse clicking functions and to turn the glove on and off. These buttons are activated by the thumb. Although the device described by Wambach does not require a surface over which a tracking device must be moved, it does require a great deal of skill and considerable practice for the user to be able to control a cursor on a video display with any degree of accuracy. Further, the device must be manually activated prior to use and manually deactivated after use so that hand movements are not inadvertently translated into cursor movements on the screen while the user is typing. Moreover, Wambach's design restricts movement of the hand during operation to small movements of the wrist (side to side), index finger (up and down), and thumb (activating click buttons). This results in reduced blood flow to the hand when compared to other mouse designs which require whole arm movements.

Another recent attempt at a solution is described in U.S. Pat. No. 6,154,199 issued to Butler on Nov. 28, 2000. Butler describes a hand positioned mouse which includes a glove having a tracking ball supported in a housing attached to the side of the index finger so that the tracking ball can be operated by the thumb. Mouse buttons are positioned on the palm of the glove for activating mouse "click" functions. Transmission means are contemplated for sending signals corresponding to tracking ball movement to the computer. However, Butler makes no provision for using a tracking device that includes an optical sensor or for using a tracking device in contact with a surface. Moreover, Butler's tracking device and mouse "click" buttons do not automatically turn "off" when not in use to permit typing, and do not automatically turn "on" again when required for moving the cursor and performing mouse "clicking" functions. Butler's device also does not include "scrolling" or "paging" functions. Further, Butler's design restricts movement of the hand during operation to small movements of the thumb and fingers required to activate the tracking device the mouse click buttons. This results in reduced blood flow to the hand when compared to other mouse designs which require whole arm movements.

From the above, it is clear that there is a need for a more ergonomically efficient mouse design to reduce or prevent injury and to improve productivity and performance.

BRIEF SUMMARY

Briefly summarized, the main object of the present computer input device is to overcome the above shortcomings by providing a computer mouse on a glove to be worn by a user, which includes a tracking device for controlling cursor movement on a video display and one or more switches for controlling mouse "click" functions.

A further object of an embodiment of the present computer input device is to provide a computer mouse on a glove to be worn by a user, which will permit the user to type on a keyboard with all fingers while wearing the glove.

Another object of an embodiment of the present computer input device is to provide a computer mouse on a glove to be worn by a user, which will automatically activate when the tracking device is in contact with a surface and the user desires to move the cursor or use the mouse "click" functions, and will automatically deactivate when the user wishes to resume typing.

Yet another object of an embodiment of the present computer input device is to provide a computer mouse on a glove, which is adjustable to the size of a user's hand and includes padding to minimize user strain and maximize performance.

Another object of an embodiment of the present computer input device is to provide a computer mouse on a glove, which includes buttons to permit a user to control up and down scrolling and paging functions without having to remove the user's hands from the computer keyboard.

A further object of an embodiment of the present computer input device is to provide a computer mouse on a glove that is positioned during use so as to allow the user's hand to be in a neutral hand posture and/or assists the user's hand and wrist into a neutral hand and wrist posture during operation so as to reduce stress and strain on the muscles and tissues of the user's hand, wrist, arm and neck.

According to one aspect then, there is provided a computer input device, comprising: a glove like apparel to be worn on a user's hand, the glove-like apparel having a fitting for at least one digit, the glove-like apparel comprising a stretchable material positioned to overlap extensor tendons running along a dorsal side of the user's hand and a dorsal side of the at least one digit of the user's hand, wherein the at least one digit fitting is designed to be anchored around a terminal area of the at least one digit and the glove-like apparel is designed to be anchored around the user's wrist area, whereby the user's hand is assisted in maintaining a neutral hand posture during use; a tracking device attached to the glove-like apparel to generate movement signals in accordance with movement of the tracking device across a surface; a pressure plate attached to the glove-like apparel, the pressure plate designed to generate switching signals; and a transmitter attached to the glove-like apparel for transmitting the movement signals and the switching signals, wherein the movement signals are for controlling movement of a cursor in a video display of a computer and the switching signals are for controlling mouse clicking functions.

According to a further aspect, there is provided a computer input device, comprising: a glove-like apparel to be worn on a user's hand, the glove-like apparel having a fitting for at least one digit; a tracking device attached to the glove-like apparel to generate movement signals in accordance with movement of the tracking device across a surface, a pressure plate attached to the glove-like apparel, the pressure plate designed to generate switching signals; and a transmitter attached to the glove-like apparel for transmitting the movement signals and the switching signals, wherein the tracking device and the pressure plate are positioned so as to require orientation of the user's hand into a neutral hand posture during use, and wherein the movement signals are for controlling movement of a cursor in a video display of a computer and the switching signals are for controlling mouse clicking functions.

According to yet another aspect, there is provided a computer input device, comprising: a glove-like apparel to be worn on a user's hand; a tracking device attached to the glove-like apparel to generate movement signals in accordance with movement of the tracking device across a surface, a pressure plate attached to the glove-like apparel, the pressure plate designed to generate switching signals; and a transmitter attached to the glove-like apparel for transmitting the movement signals and the switching signals, wherein the glove-like apparel comprises a palm area, the palm area having padding located generally over the thenar eminence and/or the hypothenar eminence of the user's hand, whereby the carpal tunnel area of the user's hand is elevated above the surface during use and pressure on the carpal tunnel area of the user's hand is minimized, and wherein the movement signals are for controlling movement of a cursor in a video display of a computer and the switching signals are for controlling mouse clicking functions.

Several advantageous features of the applicant's computer mouse on a glove are as follows:

(a) the applicant's computer mouse on a glove is the ultimate in ergonomic design since it conforms directly to the user's hand and does not require the user to conform his or her hand to the mouse. This reduces strain on the user's hand, prevents injury (such as Carpal Tunnel Syndrome and other related repetitive stress injuries), and increases productivity;

(b) the applicant's computer mouse on a glove will permit a user to type on a keyboard with all fingers while wearing the glove;

(c) the applicant's computer mouse on a glove will automatically activate when the tracking device is placed in contact with a surface allowing the user to move the cursor or use the mouse "click" functions and will automatically deactivate when a user desires to resume typing.

(d) the applicant's computer mouse on a glove can be manufactured in accordance with different hand sizes, and the use of a stretch fabric and an adjustable wrist strap permits easy accommodation of a wide range of hand and finger sizes;

(e) the applicant's computer mouse on a glove includes padding in the palm area of the glove, which will help to minimize user strain and maximize performance;

(f) the applicant's computer mouse on a glove will eliminate the need for a user to search for the computer mouse on a desktop before use;

(g) the applicant's computer mouse on a glove will permit a user to control up and down scrolling and paging functions without having to remove the user's hands from the computer keyboard; and (h) the applicant's computer mouse on a glove will permit/assist the user's hand and wrist to maintain a neutral hand and wrist posture during use.

Further objects and advantages of the applicant's computer mouse on a glove will be apparent from the following description and the appended drawings, wherein preferred embodiments are clearly described and shown.

BRIEF DESCRIPTION OF THE DRAWINGS

The applicant's computer mouse on a glove will be further understood from the following description with reference to the drawings in which:

FIG. 3 is a perspective view of the device shown in FIG. 1, worn on a user's right hand, looking down at the back of the hand.

FIG. 4 is a perspective view of the device shown in FIG. 1, worn on a user's left hand, showing the tracking device in the "on" position in contact with a surface.

FIG. 5 is a perspective, view of the device shown in FIG. 1, worn on a user's right hand, showing the tracking device in the "off" position not in contact with a surface.

DETAILED DESCRIPTION OF THE PREFERRED EMBODIMENTS

Figure 1:
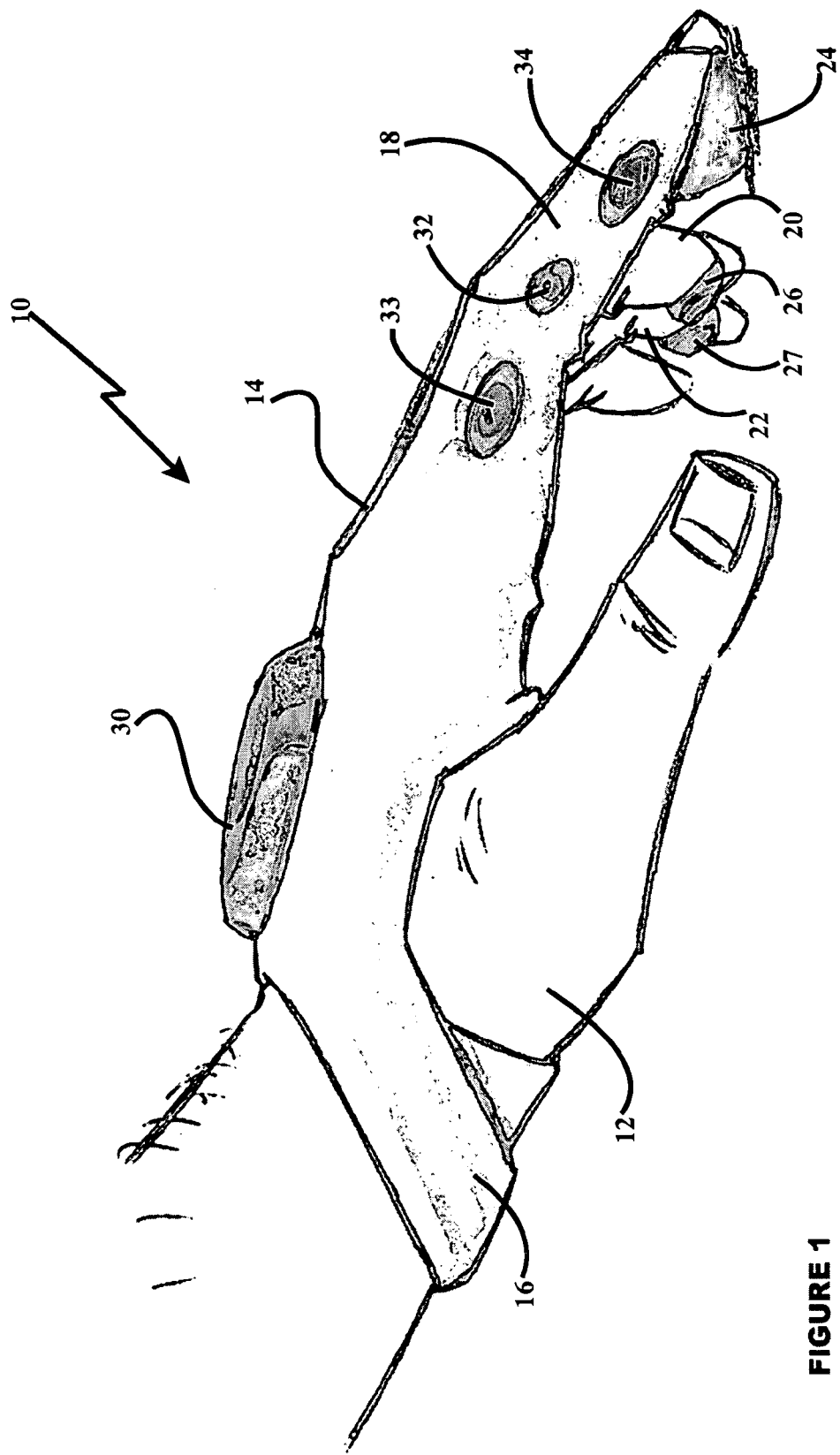
FIG. 1 is a perspective side view of one embodiment of the applicant's computer mouse on a glove worn on a user's left hand.

Referring to the drawings, FIG. 1 shows one embodiment of the applicant's computer input device 10 fitted on a user's left hand 12. The computer input device 10 includes a glove-like apparel 14 secured to the wrist with an adjustable strap or brace 16. Glove-like apparel 14 includes fittings for an index finger or digit 18, a middle finger 20 and a ring finger 22. A tracking device 24 is shown attached to the fitting for index finger 18 of glove 14 and pressure plates 26, 27 are shown attached to the fittings for middle finger 20 and ring finger 22, respectively. A transmitter 30 is attached to the top of glove 14 for positioning on the back of hand 12, and scroll/page buttons 32, 33, 34 are shown attached to the side of the fitting for index finger 18 where they can be easily accessed by the thumb of the user's hand 12.

It will be appreciated by the reader that the particular configuration of input device 10 shown in the Figures is for illustrative purposes only. Depending on user preference, tracking device 24 and pressure plates 26, 27 may be interchangeably attached to the fittings for either of index finger 18, middle finger 20, ring finger 22 or thumb (see FIGS. 11-13 and 17-18). For example, some users may prefer to attach tracking device 24 to the fitting for the more dominant middle finger 20 and attach pressure plates 26, 27 to the fittings for index finger 18 and ring finger 22, respectively.

Any reference in this application to fingers and/or digits shall include the thumb. Accordingly, as shown in FIGS. 11-13, and 17-19, glove 14 may include a fitting for a thumb, and tracking device 24 may be attached to the thumb fitting, while pressure plates 26, 27 are attached to the other finger or digit fittings.

Glove 14 can be made in various sizes, such as small, medium and large, to fit various sized hands, either left or right. Glove 14 is composed of a lightweight durable fabric having the ability to conform to the user's hand. Any suitable fabric can be used so long as it is lightweight, durable and will stretch to accommodate various sized hands. Preferably, the exterior of glove 14 will be constructed to include areas of low-friction fabric located to facilitate movement of glove 14 over surface 50. Examples of suitable fabrics include composite fabrics such as:

1) 79% nylon and 21% Lycra™ spandex;
2) 78% polyamide and 22% spandex; or
3) 5% cotton, 36% polyester, and 59% Lycra™.

The overall thickness of the fabric will preferably be between 0.8 mm and 1.4 mm to maximize both durability and flexibility while minimizing weight. Strap or brace 16 secures glove 14 to the user's wrist and can be any suitable adjustable fastening device such as Velcro™ straps, hooks and eyelets, or a button/clasp mechanism. All of these features permit the computer input device 10 to be comfortably fit to an almost limitless range of hand sizes.

Figure 14:
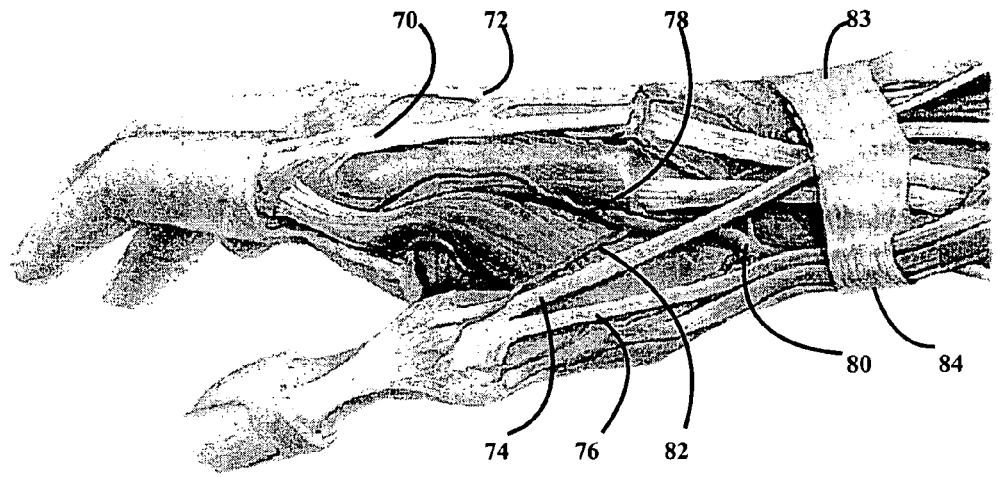
FIG. 14 is a perspective view of a human hand showing the internal structure thereof.

FIG. 14 shows the internal structure of a human hand, and in particular shows four of the extensor tendons that run along the dorsal or back side of the hand and digits, the extensor indicis 70, the extensor digitorum 72, the extensor pollicis longus 74, and the extensor pollicis brevis 76. The extensor tendons 70, 72, 74, and 76 are attached to muscles in the forearm and allow a person to straighten his/her digits. Also shown are the dorsalis indicis artery 78, the dorsales pollicis arteries 80, the radial artery 82, the extensor reticulum 83 and the flexor reticulum 84.

Figure 15:
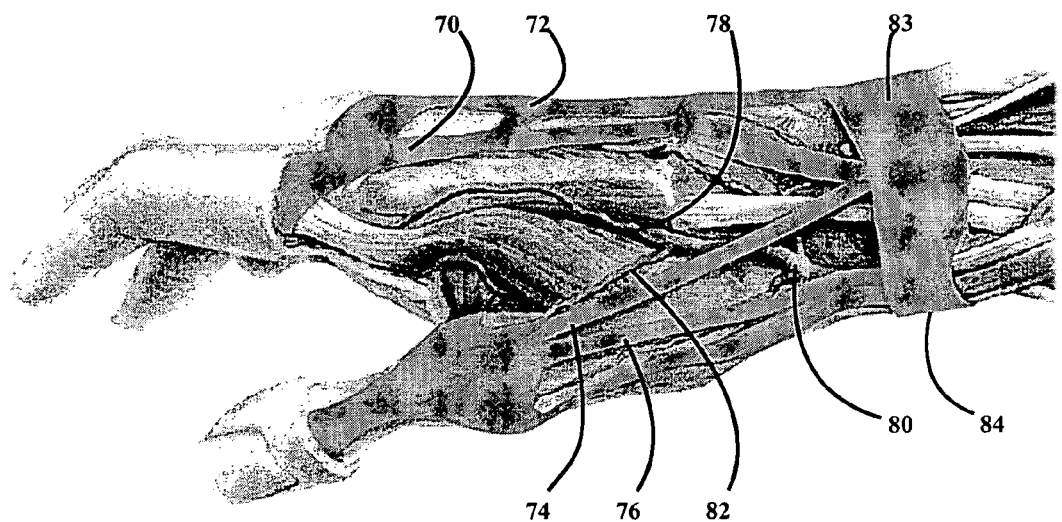
FIG. 15 is a perspective view of a human hand showing the internal structure thereof, with emphasis on the extensor tendon structure and the flexor reticulum and extensor reticulum situated near and around the wrist area.

FIG. 15 shows the same view of the human hand as in FIG. 14, with the various extensor tendons 70, 72, 74, and 76 and the flexor and extensor reticulum 83 and 84, shaded for emphasis.

Figure 16:
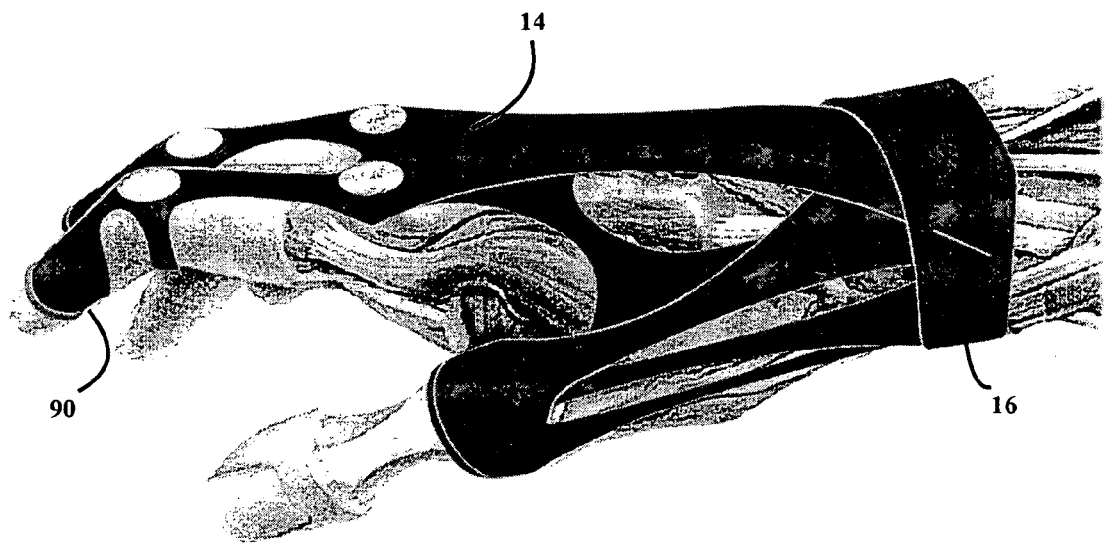
FIG. 16 is a perspective view of a human hand showing the internal structure thereof and with the glove-like apparel of the applicant's computer mouse on a glove fitted thereon.

FIG. 16 shows the same view of the human hand as in FIGS. 14 and 15, but with the applicant's glove-like apparel 14 shown positioned over the extensor tendons, and including strap or brace 16 positioned over the wrist area.

Figure 17:
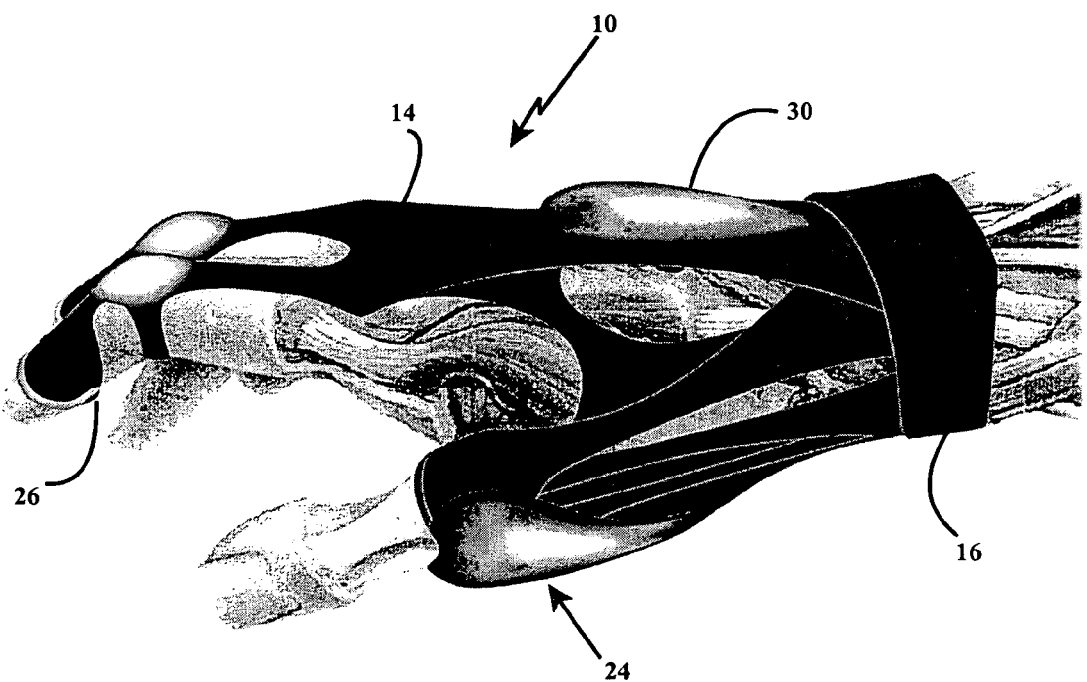
FIG. 17 is a perspective view of a human hand showing the internal structure thereof and with one embodiment of the applicant's computer mouse on a glove fitted thereon.

FIG. 17 shows the same view of the human hand as in FIGS. 14-16, but with additional fabric added to glove 14, and including strap or brace 16, which serves to limit the amount of flexion and extension and ulnar and radial deviation of the user's wrist during use, tracking device 24 affixed to the thumb digit fitting, and pressure plate 26 (additional pressure plate hidden) on the index finger.

Figure 18:
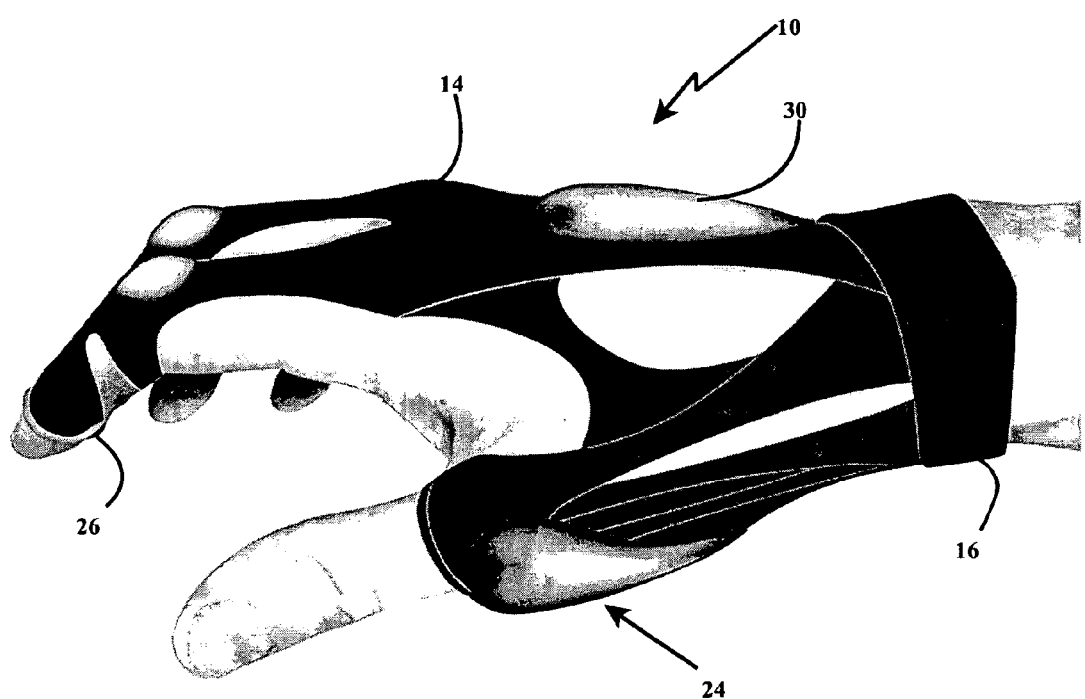
FIG. 18 is a perspective of a human hand with one embodiment of the applicant's computer mouse on a glove fitted thereon.

FIG. 18 shows a human hand similar to that in FIGS. 14-17, but without the visible internal structure, and with the applicant's computer input device 10 fitted thereon.

Figure 19:
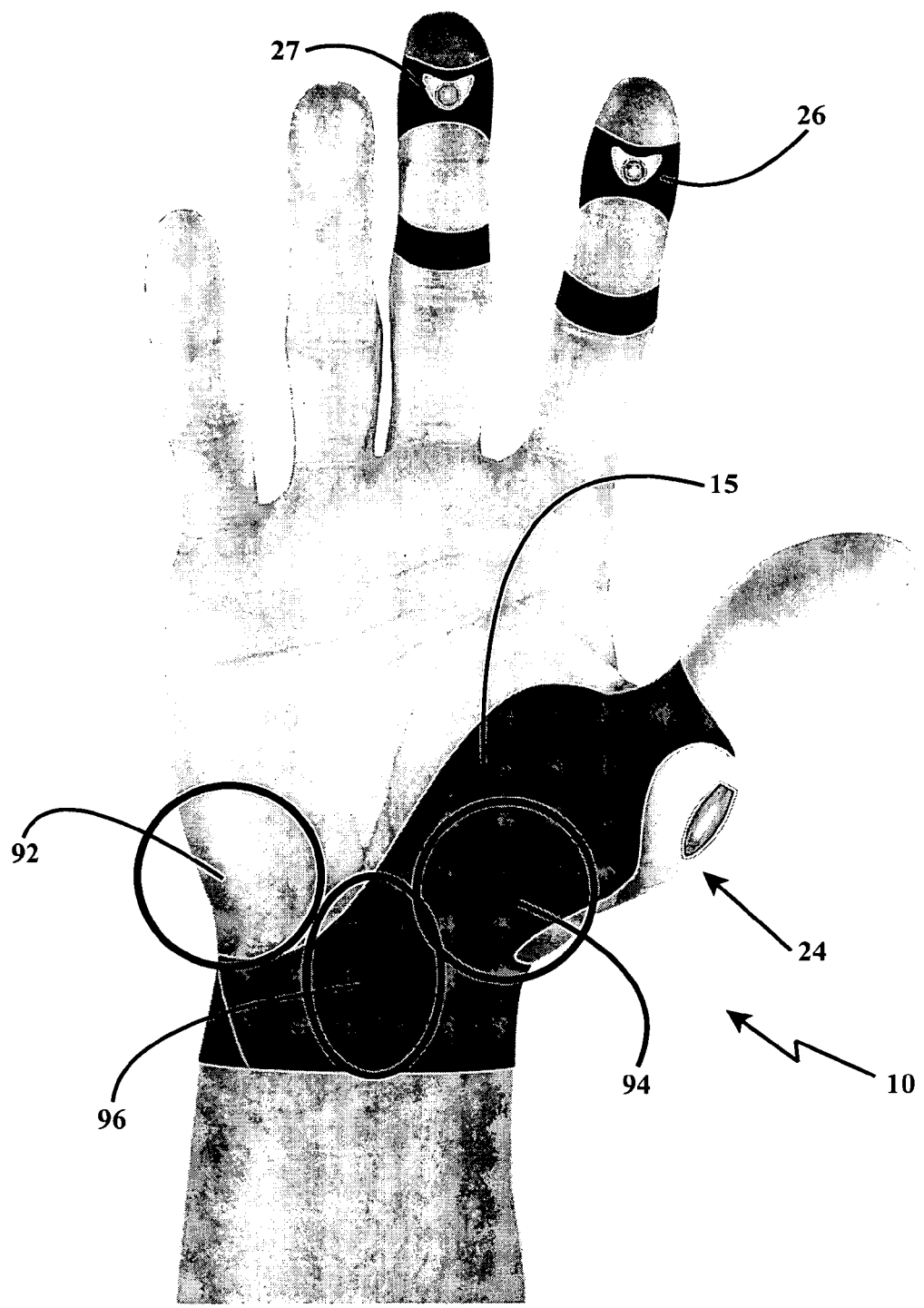
FIG. 19 is a perspective bottom view of a user's hand with one embodiment of the applicant's computer mouse on a glove fitted thereon, showing the location of the thenar and hypothenar eminence and the carpal tunnel areas of the user's hand.
Figure 20:
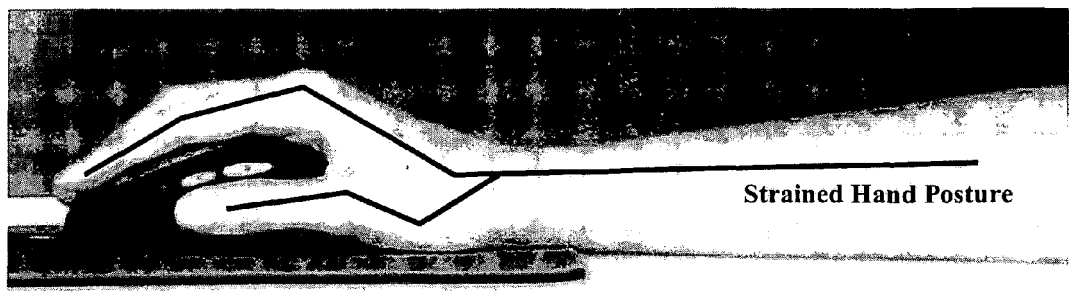
FIG. 20 is side view of a user's hand and forearm gripping a standard computer mouse, showing the hand in a strained hand posture.

FIG. 19 shows a bottom view of a user's hand with glove-like apparel 14 fitted thereon. Also shown in FIG. 19 are the carpal tunnel area 96, the thenar eminence area 92 and the hypothenar eminence area 94 of the hand and the positioning of glove 14 with respect to these areas.

Figure 21:
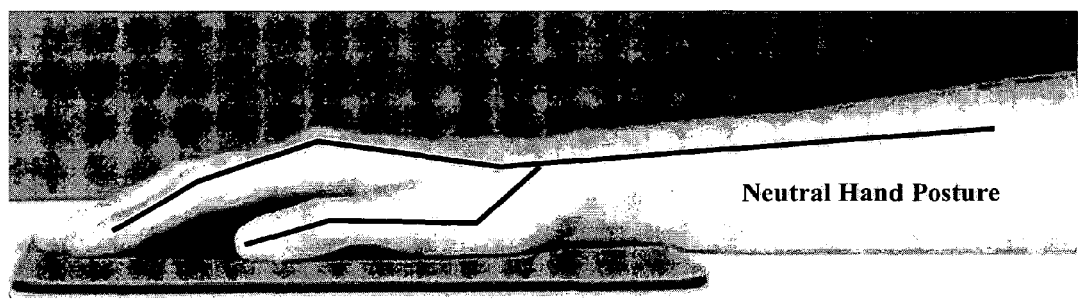
FIG. 21 is a side view of a user's hand and forearm, showing the hand in a relaxed, neutral hand posture.

The strategic positioning of the tracking device 24 and the pressure plates 26, 27 in a downward facing position on the thumb and fingers as shown particularly in FIGS. 11-13 and 17-19, requires that the user's hand be oriented in a neutral hand posture (see FIG. 21) during use. The neutral hand posture places the least amount of stress on the muscles and tissues of the hand, wrist, arm, and neck. In this neutral hand posture, the user's hand and wrist remain in a flatter, unarched posture, and the individual's weight is evenly dispersed between the hand, wrist, and arm. This posture minimizes the pinching of the median nerve within the carpal tunnel 96 and allows for the greatest amount of blood flow to and from the hand.

As shown particularly in FIGS. 1-7, 11-13, and 16-19, glove 14 conforms directly to the user's hand and is designed to overlap the extensor tendons 70, 72, 74, and 76 running along the dorsal or back side of the user's hand and digits and the flexor reticulum 84 and extensor reticulum 83 around the wrist area of the hand. Glove 14 is anchored around the distal phalanx (terminal bone) of the digits, approximately at a point 90 (see FIG. 16) and around the wrist area by way of strap or brace 16. It will be apparent to one skilled in the art, that in this configuration, the stretch material of glove 14 will act to assist in maintaining the hand and digits in a flatter, unarched posture (see FIGS. 1, 11, 12, 17 and 18), referred to as the neutral hand posture (see FIG. 21), and the strap or brace 16 around the wrist area will assist in maintaining the wrist in a neutral wrist posture during operation by limiting the flexion and extension and the ulnar and radial deviation of the wrist, both of which reduce stress on the hand and minimize pinching of the median nerve within the carpal tunnel, thus reducing the occurrence of Carpal Tunnel Syndrome. Deviations of the user's hand from the neutral hand posture due to extension and flexion of the hand are counteracted by the tension these movements create in the stretchable material of glove 14 between the anchor points around the wrist area and the distal phalanx of the digits, approximately point 90, such that the user's hand is assisted in maintaining a neutral hand posture during use. The neutral hand posture will also increase blood flow to the hand by reducing restrictions of the arteries 78, 80 and 82.

Strap or brace 16 may serve two functions. First, to anchor glove 14 around the wrist area, thereby combining with the anchor point 90 around the distal phalanx and the stretch material of the glove to maintain the hand in a neutral hand posture, and second, to limit the flexion and extension and the ulnar and radial deviation of the wrist, to thereby assist in maintaining the wrist in a neutral wrist posture. The second function may be carried out by a separate strap or brace 16 that does not necessarily also serve to anchor glove 14 around the wrist area, but does serve to assist in maintaining the wrist in a neutral wrist posture by limiting the flexion and extension and the ulnar and radial deviation of the wrist.

Figure 7:
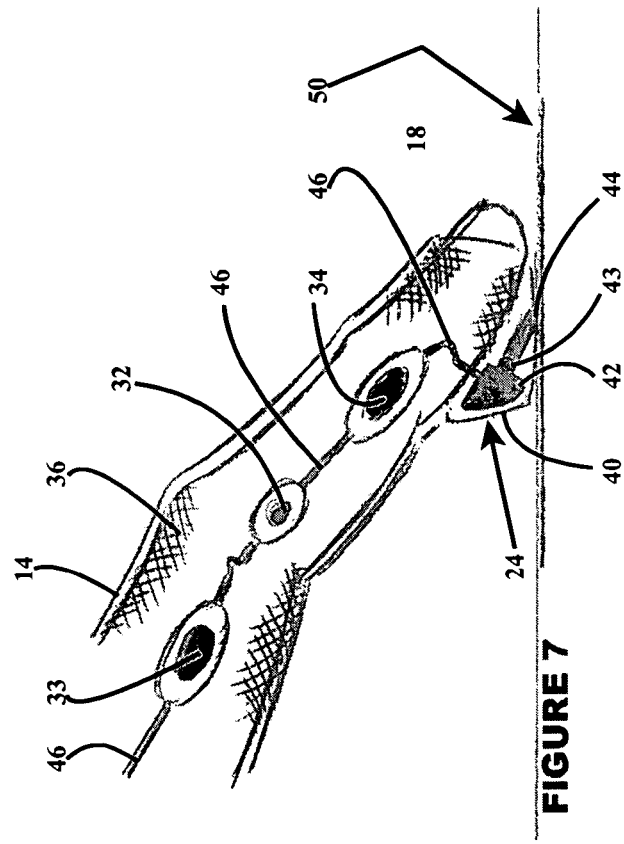
FIG. 7 is a close-up, partially sectional perspective view of the device shown in FIG. 1, showing a tracking device attached to the fitting for the index finger.
Figure 6:
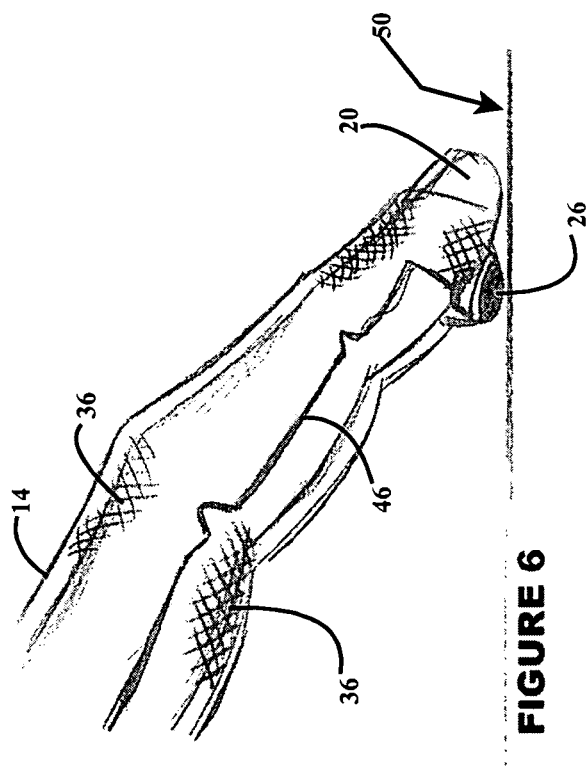
FIG. 6 is a close-up, partially sectional perspective view of the device shown in FIG. 1, showing a pressure plate attached to the fitting for the middle finger.

Referring now to FIGS. 6 and 7, which are close-up, partially sectional views of the fittings for the ring finger 20 and index finger 18, respectively. The interior surface of the fittings for the fingers can include areas of high-friction fabric 36, such as a rubber polymer, designed to create a mild friction between glove 14 and the user's hand. The areas of high-friction fabric 36 prevent glove 14 from shifting on the user's hand during prolonged use and permit more accurate positioning of tracking device 24, pressure plates 26, 27, scroll/page buttons 32, 33, 34, and transmitter 30 with respect to the user's hand.

Figure 2:
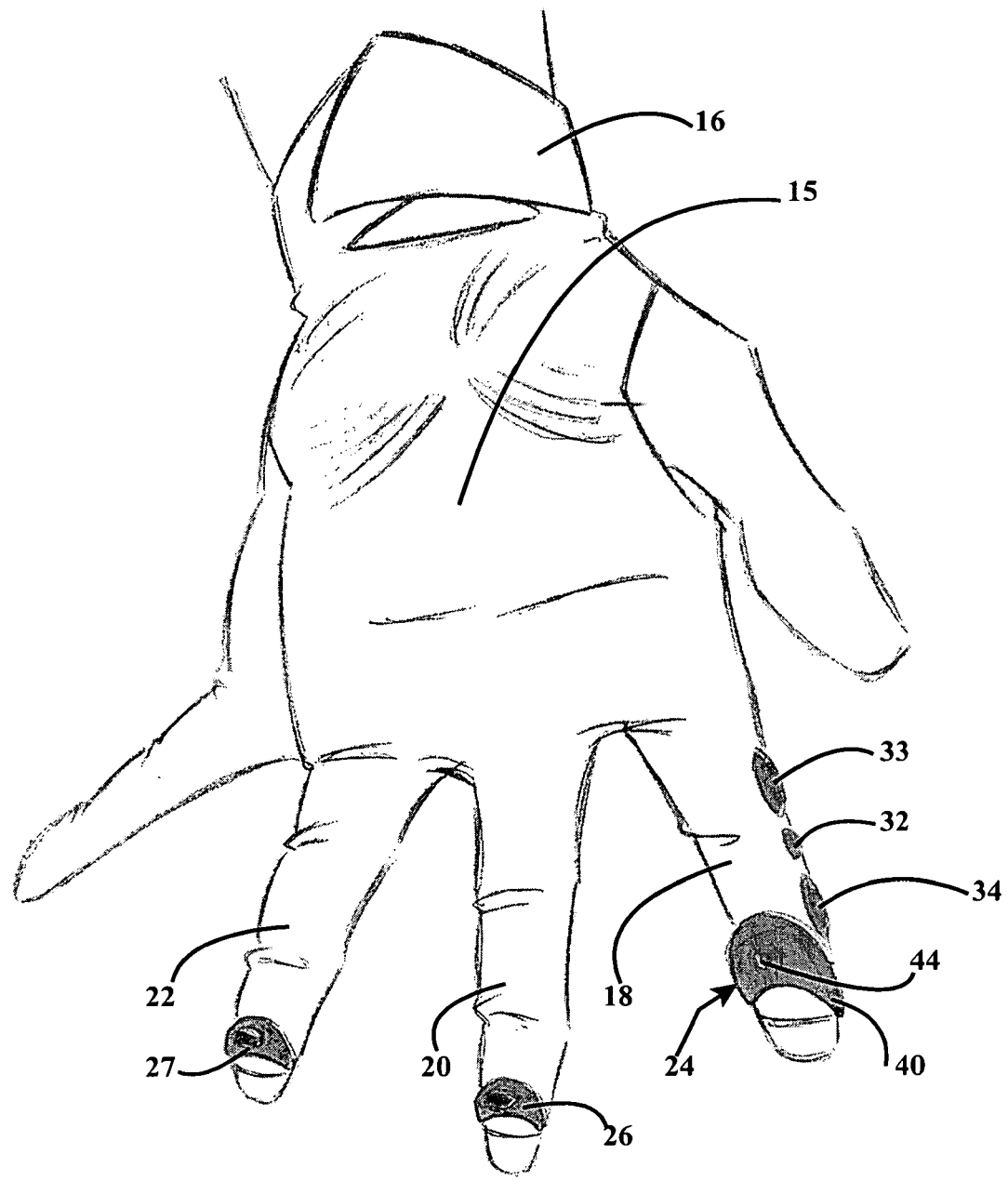
FIG. 2 is a perspective view of the device shown in FIG. 1, looking towards the palm.
Figure 13:
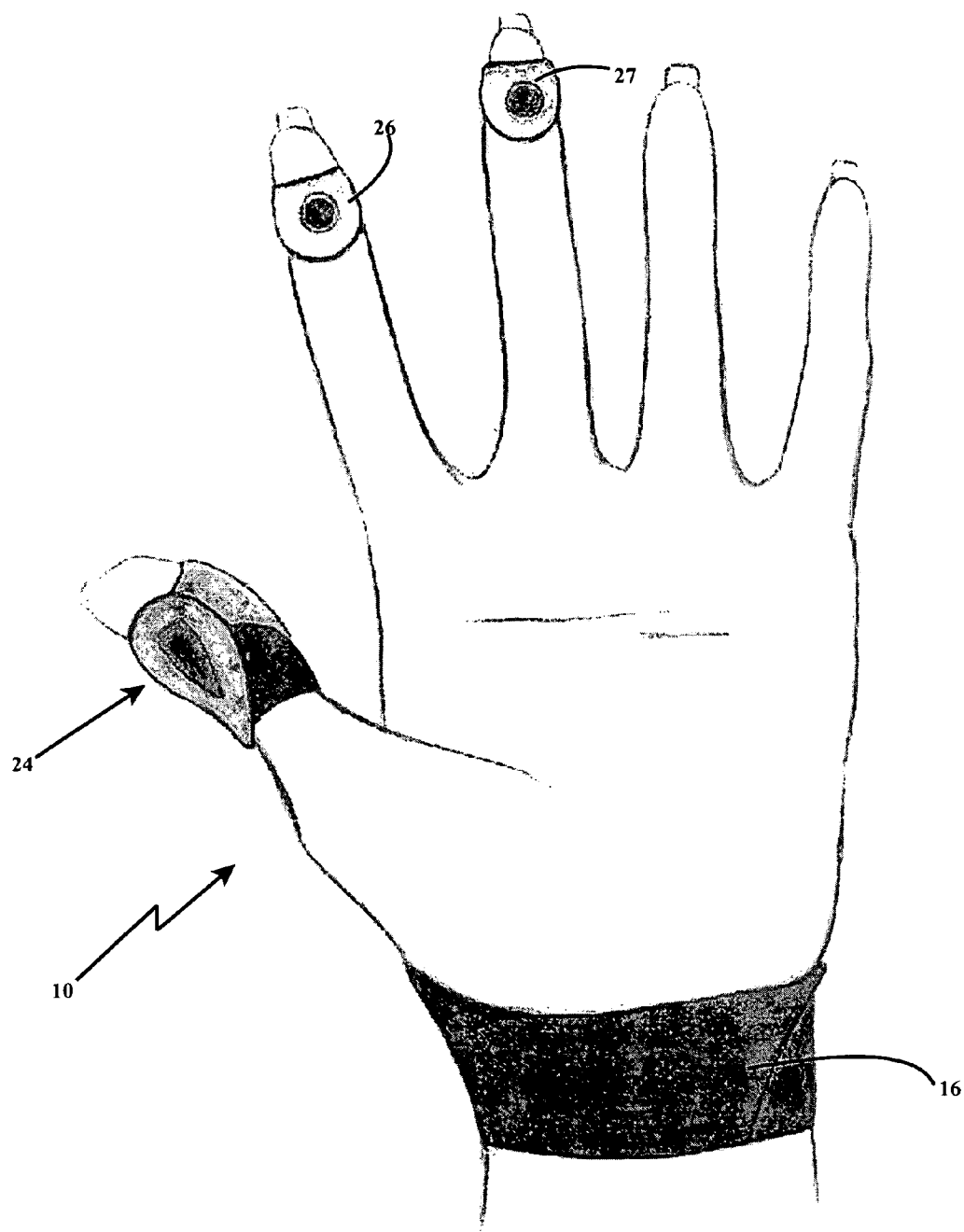
FIG. 13 is a perspective bottom view of the embodiment of the applicant's computer mouse on a glove shown in FIG. 11 and worn on the user's left hand.

Referring to FIGS. 2 and 19, glove 14 may include a palm area 15 that preferably is padded to assist in ergonomically positioning the user's hand during operation so as to minimize strain and maximize performance and comfort. The padding located in palm area 15 may be composed of any suitable material including elastic polymer gel, sponge polymer, or double stitched glove fabric. The padding in palm area 15 may preferably be located generally over the thenar eminence 92 or the hypothenar eminence 94 (as shown in FIG. 19), or preferably both, so as to elevate the carpal tunnel area 96 of the user's hand off the surface during use such that pressure on the carpal tunnel area 96 is minimized. In addition, padding may be located generally over the carpal tunnel area 96 to further minimize pressure on the carpal tunnel area. As shown in FIG. 13, palm area 15 may be omitted.

FIG. 7 is a close up, partially sectional view of the fitting for index finger 18 fitted on a user's hand, showing, in this case, tracking device 24 attached near the end. As noted above, tracking device 24 may also be attached to the fittings for either middle finger 20 or ring finger 22, or the thumb (see FIGS. 11 to 13), depending on user preference. In the illustrated case, tracking device 24 is an optical tracking device which includes a base plate 40 for housing an optical sensor 42. Base plate 40 allows for smooth consistent motion of tracking device 24 over a surface 50 and ensures that a consistent distance and an even surface contact is maintained between optical sensor 42 and surface 50. Optical sensor 42 can be any suitable optical sensor, which is capable of accurately tracking movement of tracking device 24 over surface 50 and generating an electrical movement signal corresponding thereto. The movement signal generated by optical sensor 42 is sent along wires 46, which are laid into the fabric of glove 14, to transmitter 30 for relaying to a computer for controlling a cursor on a video display. Those skilled in the art will be well aware of the various types of optical sensors that could be used in the applicant's computer mouse on a glove. Traditional optical sensors used for tracking movement have required use of a special mouse pad to enable the sensor to accurately detect and measure movement. Newly designed optical sensors no longer require a special mouse pad and can function on virtually any surface, including a desktop or a user's pants. In this latter design, a bright light emitting diode 43 illuminates an area of surface 50 through a small angular oval shaped opening 44 in the bottom of base plate 40 (see FIGS. 2 and 7) immediately below a tiny camera (not shown) which detects reflections off the surface. The steep angle of lighting maximizes detection of surface irregularities permitting the camera to detect and measure movement across the surface. One advantage of using an optical tracking device is that, unlike conventional roller-ball tracking devices, an optical device does not collect dust and does not require any significant cleaning.

In the alternative, the reader will appreciate that a micro roller-ball could be used in place of optical sensor 42 for measuring movement of tracking device 24 over surface 50 and for generating an electrical movement signal corresponding to that movement. A micro roller-ball would operate in a manner similar to the roller-ball systems used in the traditional desktop computer mouse. Rotation of the roller-ball, resulting from contact with surface 50, is picked up by sensors within the tracking device, which produce an electrical movement signal or pulse corresponding to the rotation.

Tracking device 24 is preferably designed so that it automatically turns "on" when placed in contact with surface 50 and automatically turns "off" when contact with surface 50 is interrupted. This can be accomplished using a small micro-switch (not shown) located on the bottom of base plate 40 or internally, or by optical sensor 42, which can be configured to turn tracking device 24 on/off when moved a certain predetermined distance from surface 50. This is illustrated in FIGS. 4 and 5. FIG. 4 shows tracking device 24 in the "on" position in contact with surface 50 and FIG. 5 shows tracking device 24 in the "off" position wherein contact with surface 50 has been interrupted. When tracking device 24 is in the "on" position, pressure plates 26, 27 are also in the "on" position. When tracking device 24 is raised from surface 50 and is in the "off" position, pressure plates 26, 27 are also turned "off". This is advantageous since it permits the user to type on a keyboard with all fingers and perform other activities without fear of engaging the device or sending unwanted input to the computer. When the user needs to move a cursor on a video screen or perform mouse "click" functions, no additional movements are required to turn on the device. All the user has to do is place tracking device 24 in contact with a surface and the device will automatically turn "on". Similarly, these functions will automatically turn "off" when contact with the surface and tracking device 24 is broken.

FIG. 6 is a close up, partially sectional view of the fitting for middle finger 20 fitted on a user's hand, showing, in this case, pressure plate 26 attached near the end. FIG. 6 could equally represent the same view of the fitting for ring finger 22 or index finger 18, or be illustrative of pressure plate 27. Pressure plates 26, 27 each include a micro-switch (not shown) that is activated by a predetermined amount of pressure contact with surface 50. Pressing down on pressure plates 26, 27 with a predetermined amount of force will generate a switching signal which is sent along wires 46 to transmitter 30. Switching signals generated by pressure plates 26, 27 correspond to traditional right and left mouse "clicking" functions that are typically used to activate a function or command identified by the cursor location, on a computer video display, or they can be set to control certain software features, such as highlighting in a word processor. As described above, pressure plates 26, 27 are activated when tracking device 24 is placed in contact with surface 50 and deactivated when contact between surface 50 and tracking device 24 is broken. Those skilled in the art will appreciate that both pressure plates 26, 27 are not required and that the applicant's computer input device 10 could function with only one such pressure plate, however, two are preferable.

It can be seen from FIGS. 1-7, 11-13, and 17-19, that tracking device 24 and pressure plates 26, 27 are located sufficiently back from the tips of the fingers, and the finger tips are sufficiently exposed to permit typing on a keyboard with all of the user's fingers while glove 14 is fitted on the hand of a user. As shown, the tips of the fittings for the fingers may be removed to expose the user's finger tips, thereby providing the user with added control and sensitivity when performing delicate tasks.

FIGS. 1, 2, 3, 4, 5 and 7 show scroll/page buttons 32, 33, 34 located on the outside of the fitting for index finger 18 of glove 14 where they can be easy activated by the thumb of a user when glove 14 is fitted on a user's hand. Scroll/page buttons 32, 33, 34 each include a micro-switch that can be pressed to generate scroll/page signals, which are sent to transmitter 30 along wires 46. Typically, scroll/page signals generated by scroll/page buttons 32, 33, 34 are used for controlling up and down scrolling and paging functions available in many software applications. Scrolling is defined as the action of moving a computer display either forward or backward through data one or many lines at a time. Paging is defined as either moving a computer display forward or backward through data one page at a time, or, in an Internet browser application, paging forward or backward through web pages.

In a preferred embodiment of the applicant's computer mouse on a glove, central scroll/page button 32 is used as a switch to alternate the function of scroll/page buttons 32, 34 between scrolling and paging. Scroll/page buttons 33, 34 control up and down scrolling and paging functions, respectively, depending on software and the position of scroll/page switch 32. One advantage of scroll/page buttons 32, 33, 34 is that a user does not have to remove his/her hands from the keyboard to activate and control the scrolling or paging features, nor does the user have to make contact with any surface to engage the scrolling features. Depending on user preference, the functions of scroll/page buttons 32, 33, 34 are completely interchangeable so that either button may act as the switch button while the other two buttons function as scroll/page up/down buttons.

Figure 10:
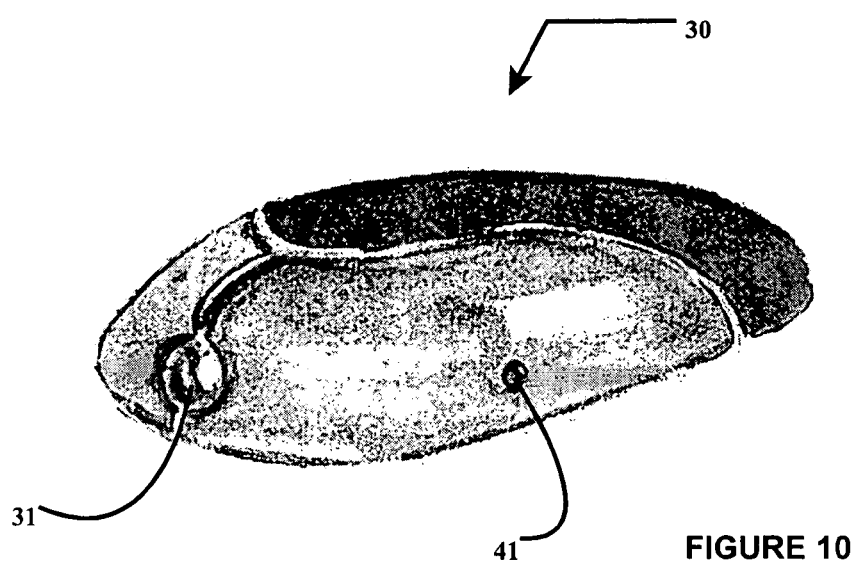
FIG. 10 is a close-up perspective view of one possible embodiment of a transmitter of the applicant's computer mouse on a glove as shown in FIG. 1.
Figure 11:
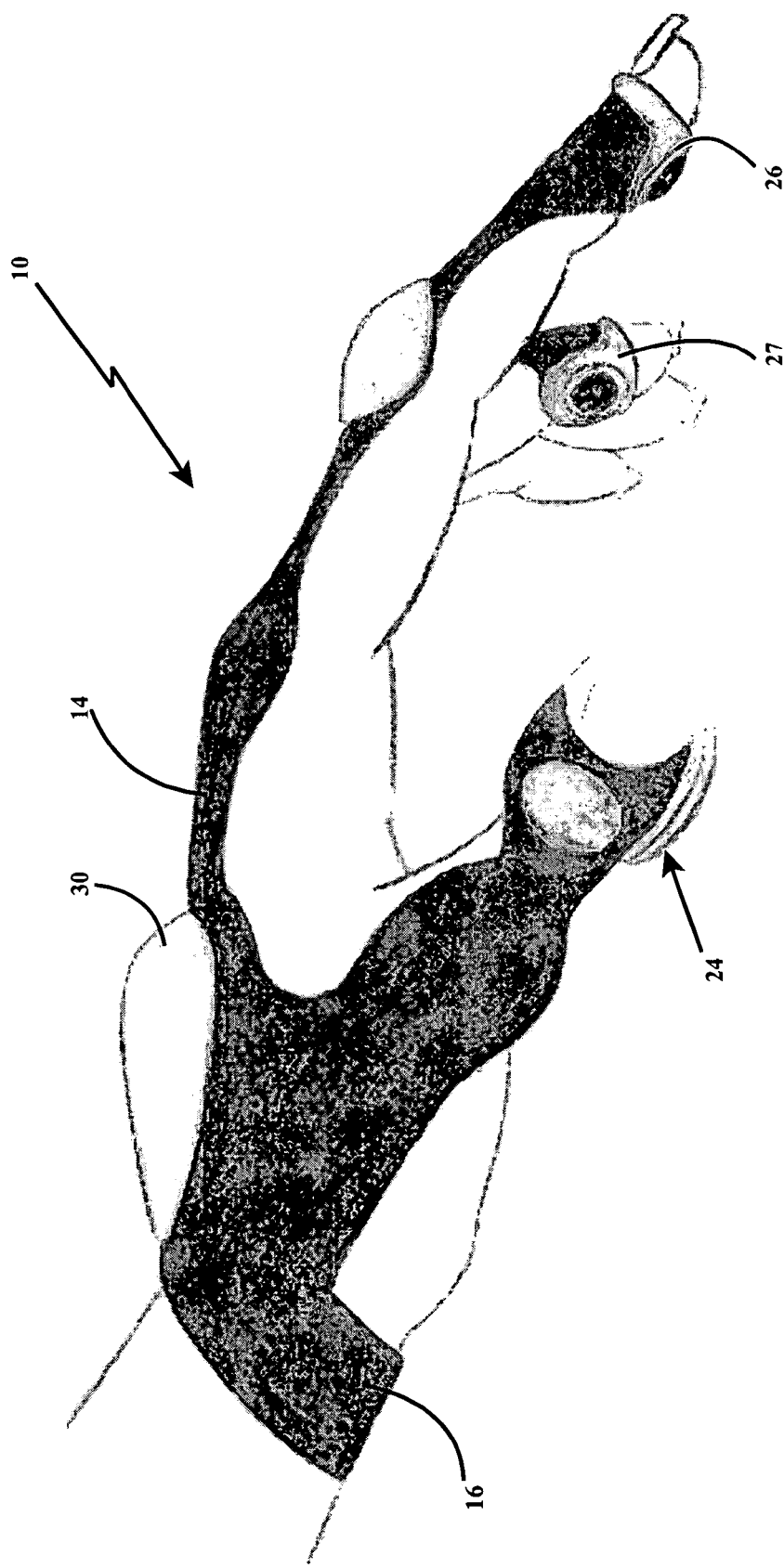
FIG. 11 is a perspective side view of another embodiment of the applicant's computer mouse on a glove worn on the user's left hand, showing the tracking device attached to the fitting for the thumb finger or digit.
Figure 12:
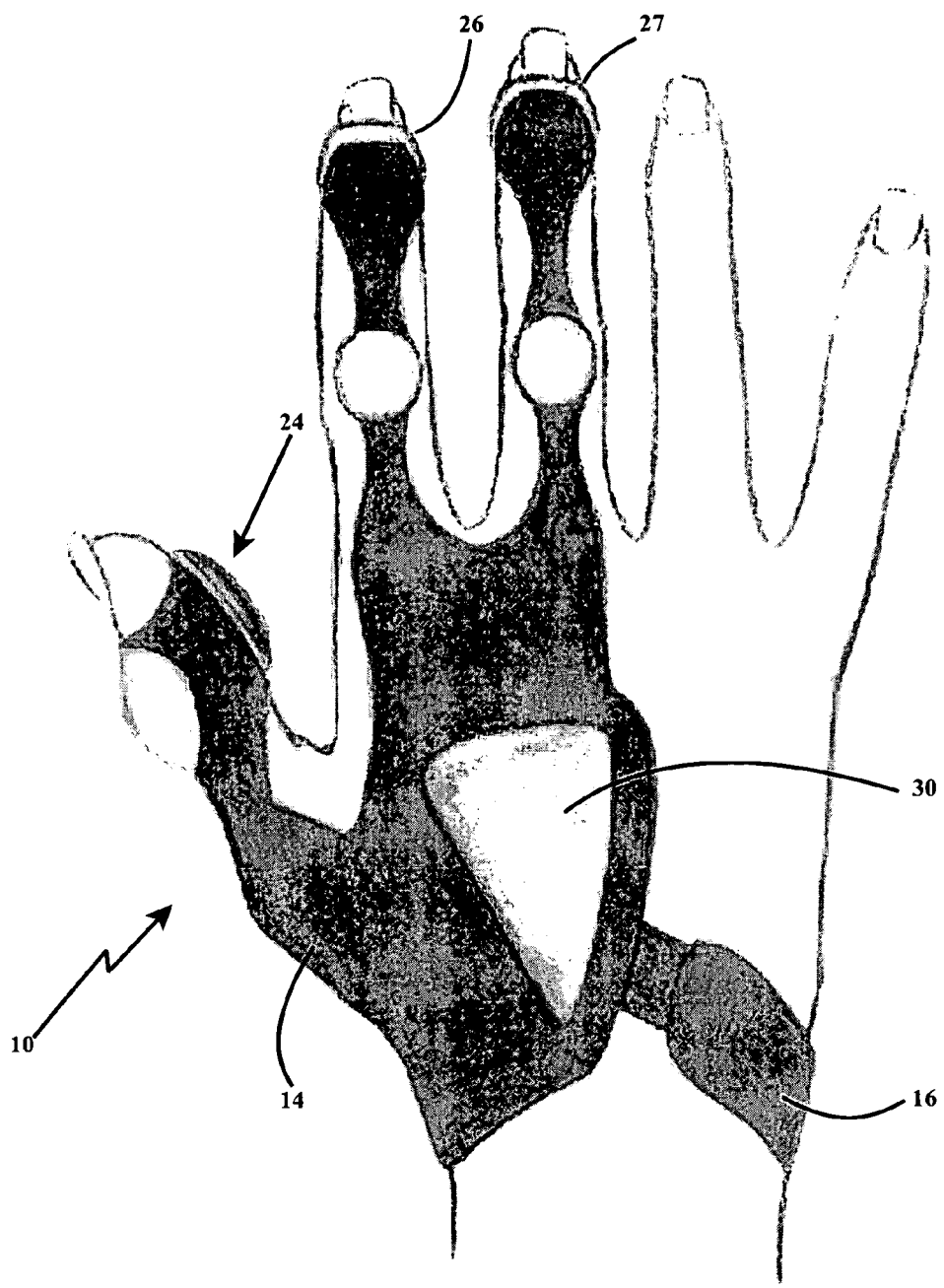
FIG. 12 is a perspective top view of the embodiment of the applicant's computer mouse on a glove shown in FIG. 11, worn on the user's right hand.

FIGS. 1, 3, 4, 5, 11, 12, 17 and 18 show transmitter 30, which is typically affixed to the back side of glove 14. FIG. 10 shows an enlarged view of transmitter 30 disconnected from glove 14. Transmitter 30 is preferably either a radio frequency (RF) transmitter, or an infrared (IR) transmitter, but may be any other suitable device capable of wirelessly transmitting signals received along wires 46 from tracking device 24, pressure plates 26, 27 and scroll/page buttons 32, 33, 34, between glove 14 and a computer. In the alternative, transmitter 30 may communicate to a computer via a connector cord (not shown), but this method of transmitting signals would reduce the mobility and functionality of the applicant's computer mouse on a glove and is not recommended by the applicant. Transmitter 30 is typically powered by lightweight, on-board, rechargeable batteries, such as nickel-cadmium batteries, which have a long life and can be easily re-charged through charging port 31. Glove 14 can be used while the batteries are being charged, but the power cord that would be used to connect to charging port 31 would be somewhat obtrusive. Transmitter 30 also includes a low battery indicator light 41. To save power, transmitter 30 can be designed to automatically turn off after a certain period of non-use. Activating tracking device 24, or pressing any of scroll/page buttons 32, 33, 34 would automatically re-engage transmitter 30.

Figure 8:
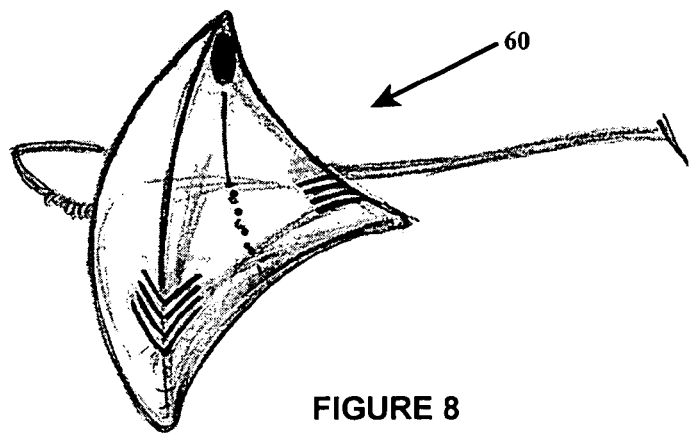
FIG. 8 is a perspective view of one possible embodiment of a receiver of the applicant's computer mouse on a glove.
Figure 9:
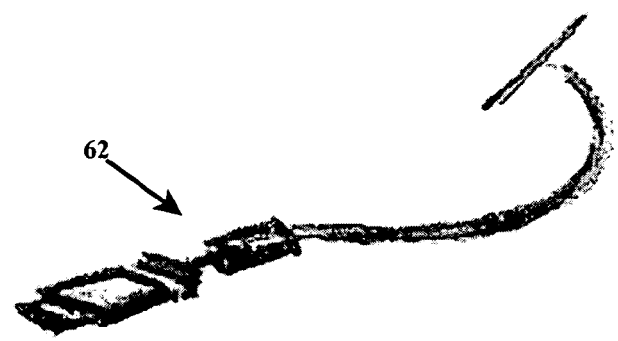
FIG. 9 is a perspective view of one possible embodiment of a USB port connector cable of the applicant's computer mouse on a glove.

FIG. 8 shows a wireless receiver 60 for receiving wireless signals from transmitter 30. As indicated above, receiver 60 may be either an RF receiver or an IR receiver, depending on the configuration of transmitter 30, or may be any suitable receiver capable of receiving wireless signals from transmitter 30 for communication between glove 14 and a computer. Receiver 60 is connected to a computer through an input port such as a USB port, using, for example, cable 62 shown in FIG. 9. Movement signals, switching signals and scrolling/paging signals generated by computer input device 10 are relayed by transmitter 30 to receiver 60 and further through cable 62 to the computer for controlling the various mouse functions described, such as cursor movement, "clicking" functions, and scrolling/paging functions. Depending on the mode of wireless communication utilized, receiver 60 may need to be placed on the desk top within the line of site of transmitter 30 (if IR transmission is used) or it may be possible to place it out of the way, near the back of the computer (if RF transmission is used). In the alternative, if the transmission of signals between computer input device 10 and the computer is accomplished over a connector cable, receiver 60 would not be required and transmitter 30 could be connected directly to the computer with a connector cable.

In operation, a user fits glove 14 of computer input device 10 on either the left or right hand, depending on the configuration, and secures it to the wrist with strap or brace 16. Tracking device 24 and pressure plates 26, 27 are positioned just behind the finger tips. User preference will determine on which finger fittings each of the pressure plates 26, 27 and tracking device 24 are attached. If tracking device 24 is located on the fitting for the thumb, it may be positioned farther back of the thumb tip as shown in FIGS. 17-19. Scroll/page buttons 32, 33, 34 are preferably located on the side of the fitting for index finger 18, next to the thumb for easy operation. Transmitter 30 is located on the back of the hand and receiver 60 is plugged into a computer, unless a connector cable is used, in which case, a connector cable directly connects transmitter 30 to the computer. At this point, the device 10 is "off" and the user is able to type on a keyboard with all fingers and perform normal functions without activating any computer mouse functions. To control a cursor on the computer screen, a user places tracking device 24 in contact with surface 50 (see FIGS. 4 and 7). This activates sensor 42 and pressure plates 26, 27. Any movement of tracking device 24 over surface 50 generates movement signals which are transmitted by transmitter 30 to receiver 60 and then through cable 62 to the computer to effect corresponding movement of a cursor on the computer screen. Mouse "clicking" functions are controlled by pressing down on pressure plates 26, 27 to generate switching signals, which are also transmitted to the computer. Once tracking device 24 is raised from surface 50 (see FIG. 5) sensor 42 and pressure plates 26, 27 are deactivated and typing can resume normally. To control scrolling or paging functions, the user merely presses scroll/page up/down buttons 33, 34 to scroll or page backwards and forwards through screen data. If transmitter 30 had disengaged following a period of non-use, touching scroll/page buttons 32, 33, 34 would re-engage transmitter 30. Scroll/page switch button 32 is used to alternate between the scrolling and paging functions. In an Internet browser application the page function can be used to page forward or backward through web pages. A main advantage of the applicant's computer mouse on a glove is that scrolling/paging features can be controlled without moving the user's hands from the keyboard.

The present computer input device 10 is supported by software, which must be installed on the computer to which device 10 is attached. The software will permit full customization of all features of the applicant's computer mouse on a glove. For example, sensitivity of cursor movement could be adjusted in the software from fine to coarse depending on user preference and needs. Mouse "right click" and "left click" functions, controlled by pressure plates 26, 27, could be interchanged depending upon user preference. In addition, the functions of scroll/page buttons 32, 33, 34 could be selected according to a user's needs or preference. Preferred settings selected by different users could be saved to permit easy interchange of the applicant's computer mouse on a glove between users.

The above is a detailed description of particular preferred embodiments of the applicant's computer mouse on a glove. Those with skill in the art should, in light of the present disclosure, appreciate that obvious modifications of the embodiments disclosed herein can be made without departing from the spirit and scope of the applicant's computer mouse on a glove. All of the embodiments disclosed and claimed herein can be made and executed without undue experimentation in light of the present disclosure. The full scope of the applicant's computer mouse on a glove is set out in the claims that follow and their equivalents. Accordingly, the claims and specification should not be construed to unduly narrow the full scope of protection to which the applicant's computer mouse on a glove is entitled.

The invention claimed is:

1. A computer input device, comprising:
   a glove-like apparel to be worn on a user's hand, said glove-like apparel having a fitting for at least one digit, said glove-like apparel comprising a stretchable material positioned to overlap extensor tendons running along a dorsal side of the user's hand and a dorsal side of the at least one digit of the user's hand, wherein said at least one digit fitting is designed to be anchored around a terminal area of the at least one digit and said glove-like apparel is designed to be anchored around the user's wrist area, whereby the stretchable material assists the user's hand and said at least one digit in maintaining a flat, unarched neutral hand posture during use;

a tracking device attached to said glove-like apparel to generate movement signals in accordance with movement of said tracking device across a surface;

a pressure plate attached to said glove-like apparel, said pressure plate designed to generate switching signals; and a transmitter attached to said glove-like apparel for transmitting said movement signals and said switching signals, wherein said movement signals are for controlling movement of a cursor in a video display of a computer and said switching signals are for controlling mouse clicking functions, and wherein said tracking device and said pressure plate are positioned sufficiently back from the tips of the digits of the user's hand to expose the tips of the digits so as to provide the user with added control and sensitivity when performing delicate tasks and so as to permit a user to type on a standard computer keyboard with all digits when said glove-like apparel is worn on the user's hand and said tracking device and said pressure plate are in an operable position.

2. The computer input device of claim 1, wherein said glove-like apparel includes a strap or brace around the user's wrist area to assist in maintaining the wrist in a neutral wrist posture.

3. The computer input device of claim 1, wherein said tracking device is attached to one of said at least one digit fitting in a downward facing position so as to require orientation of the user's hand into said neutral hand posture during use.

4. The computer input device of claim 1, wherein said pressure plate is attached to one of said at least one digit fitting in a downward facing position so as to require orientation of the user's hand into said neutral hand posture during use, and wherein said pressure plate is designed to generate said switching signals when pressed against said surface.

5. The computer input device of claim 4, wherein said surface is substantially parallel to the palm of the user's hand during use.

6. The computer input device of claim 1, wherein said glove-like apparel includes fittings for at least two digits and said pressure plate is attached to one of said at least two digit fittings in a downward facing position and said tracking device is attached to another one of said at least two digit fittings in a downward facing position so as to require orientation of the user's hand into said neutral hand posture during use.

7. The computer input device of claim 1, including an on/off switch for automatically disengaging said tracking device and said pressure plate whenever said tracking device is not in contact with said surface and for automatically engaging said tracking device and said pressure plate whenever said tracking device is in contact with said surface.

8. The computer input device of claim 1, wherein said glove-like apparel further comprises a palm area, said palm area having padding located generally over the thenar eminence and/or the hypothenar eminence of the user's hand, whereby the carpal tunnel area of the user's hand is elevated above said surface during use and pressure on the carpal tunnel area of the user's hand is minimized.

9. The computer input device of claim 8, wherein said palm area of said glove-like apparel also includes padding located generally over the carpal tunnel area of the user's hand, whereby pressure on the carpal tunnel area of the user's hand is further minimized.

10. A computer input device, comprising:

a glove-like apparel to be worn on a user's hand, said glove-like apparel having a fitting for at least one digit;

a tracking device attached to said glove-like apparel to generate movement signals in accordance with movement of said tracking device across a surface, a pressure plate attached to said glove-like apparel, said pressure plate designed to generate switching signals; and a transmitter attached to said glove-like apparel for transmitting said movement signals and said switching signals, wherein said tracking device and said pressure plate are positioned in a downward facing position so as to require orientation of the user's hand and digits into a flat, unarched neutral hand posture during use, wherein said movement signals are for controlling movement of a cursor in a video display of a computer and said switching signals are for controlling mouse clicking functions, and wherein said tracking device and said pressure plate are positioned sufficiently back from the tips of the digits of the user's hand to expose the tips of the digits so as to provide the user with added control and sensitivity when performing delicate tasks and so as to permit the user to type on a standard computer keyboard with all digits when said glove-like apparel is worn on the user's hand and said tracking device and said pressure plate are in an operable position.

11. The computer input device of claim 10, wherein said glove-like apparel comprises a stretchable material positioned to overlap extensor tendons running along a dorsal side of the user's hand and a dorsal side of at least one digit of the user's hand, and wherein said at least one digit fitting is designed to be anchored around a terminal area of the at least one digit, and said glove-like apparel is designed to be anchored around the user's wrist area, whereby the stretchable material assists the user's hand and said at least one digit in maintaining said neutral hand posture during use.

12. The computer input device of claim 11, wherein said glove-like apparel includes a strap or brace around the user's wrist area to assist in maintaining the wrist in a neutral wrist posture.

13. The computer input device of claim 10, wherein said pressure plate is designed to generate said switching signals when pressed against said surface.

14. The computer input device of claim 13, wherein said surface is substantially parallel to the palm of the user's hand during use.

15. The computer input device of claim 10, wherein said glove-like apparel includes fittings for at least two digits, and said pressure plate is attached to one of said at least two digit fittings in a downward facing position, and said tracking device is attached to another one of said at least two digit fittings in a downward facing position.

16. The computer input device of claim 10, including an on/off switch for automatically disengaging said tracking device and said pressure plate whenever said tracking device is not in contact with said surface and for automatically engaging said tracking device and said pressure plate whenever said tracking device is in contact with said surface.

17. The computer input device of claim 10, wherein said glove-like apparel further comprises a palm area, said palm area having padding located generally over the thenar eminence and/or the hypothenar eminence of the user's hand, whereby the carpal tunnel area of the user's hand is elevated above said surface during use and pressure on the carpal tunnel area of the user's hand is minimized.

18. The computer input device of claim 17, wherein said palm area of said glove-like apparel also includes padding located generally over the carpal tunnel area of the user's hand, whereby pressure on the carpal tunnel area of the user's hand is further minimized.

* * * * *